(12) United States Patent
Greywall

(10) Patent No.: US 6,995,895 B2
(45) Date of Patent: Feb. 7, 2006

(54) MEMS ACTUATOR FOR PISTON AND TILT MOTION

(75) Inventor: Dennis S. Greywall, Whitehouse Station, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 29 days.

(21) Appl. No.: 10/772,847

(22) Filed: Feb. 5, 2004

(65) Prior Publication Data

US 2005/0174624 A1  Aug. 11, 2005

(51) Int. Cl.
G02B 26/00 (2006.01)

(52) U.S. Cl. ...................... 359/290; 310/309

(58) Field of Classification Search .............. 359/290, 359/291, 198, 199, 201, 202, 203, 214; 310/309
See application file for complete search history.

(56) References Cited

U.S. PATENT DOCUMENTS

| | | |
|---|---|---|
| 5,501,893 A | 3/1996 | Laermer et al. |
| 5,629,790 A | 5/1997 | Neukermans et al. |
| 5,745,278 A | 4/1998 | La Fiandra |
| 6,201,631 B1 | 3/2001 | Greywall |
| 6,283,601 B1 | 9/2001 | Hagelin et al. |
| 6,384,952 B1 | 5/2002 | Clark et al. |
| 6,497,141 B1 * | 12/2002 | Turner et al. .................. 73/105 |
| 6,771,001 B2 * | 8/2004 | Mao et al. ................... 310/309 |

* cited by examiner

*Primary Examiner*—Scott J. Sugarman
*Assistant Examiner*—Richard Hanig

(57) ABSTRACT

A MEMS device having a spring structure formed by two flexible beams attached between a substrate and a movable bar. When non-end sections of the beams are pulled in opposite directions, the beam ends attached to the movable bar pull that bar toward the substrate, thereby transforming in-plane motion of the non-end sections into out-of-plane motion of the movable bar. When the non-end sections are displaced symmetrically, the movable bar translates toward the substrate. Alternatively, when the non-end sections are displaced non-symmetrically, the movable bar rotates with respect to the substrate. In one embodiment, each flexible beam is attached to a comb-shaped portion of a motion actuator, which has two such portions, each portion interleaved with the other portion and adapted to move with respect to the substrate and that other portion. When a voltage differential is applied between the portions, they move substantially parallel to the substrate, thereby deforming the beams and translating/rotating the movable bar.

29 Claims, 12 Drawing Sheets

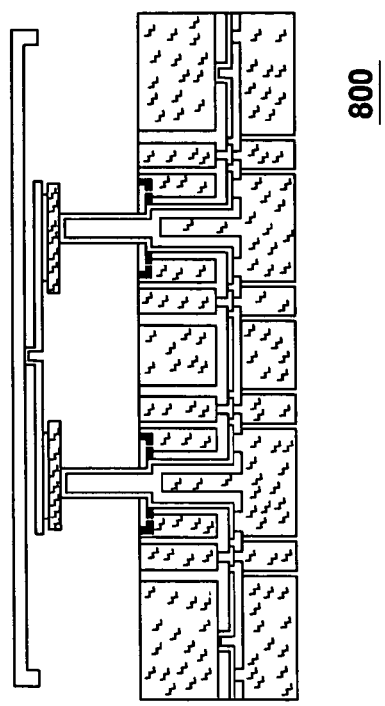
FIG. 9S
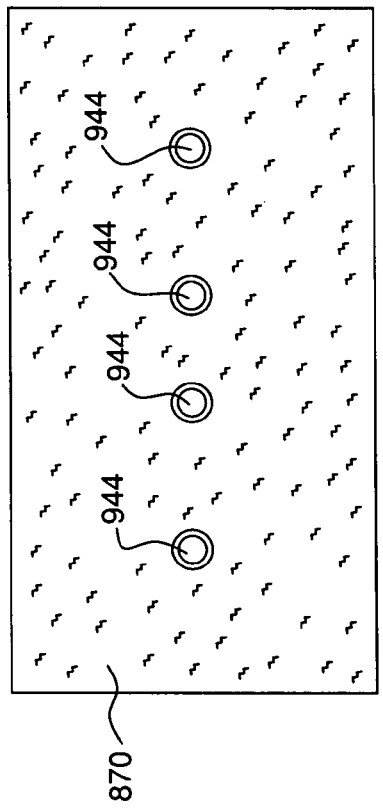
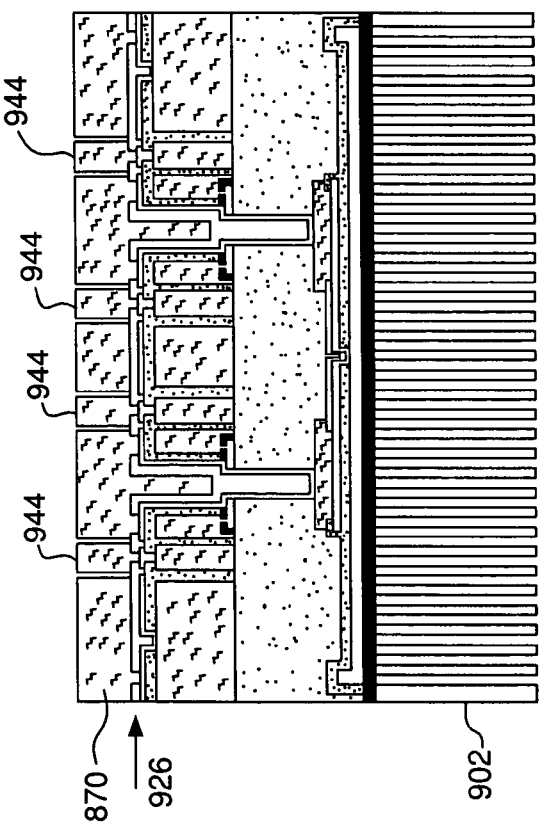
FIG. 9R
FIG. 9Q

MEMS ACTUATOR FOR PISTON AND TILT MOTION

BACKGROUND OF THE INVENTION

1. Field of the Invention

The present invention relates to adaptive optics and, more specifically, to micro-electromechanical systems (MEMS) for implementing adaptive optics.

2. Description of the Related Art

Adaptive optics is a field of optics dedicated to the improvement of optical signals using information about signal distortions introduced by the environment in which the optical signals propagate. An excellent introductory text on the subject is given in "Principles of Adaptive Optics" by R. K. Tyson, Academic Press, San Diego, 1991, the teachings of which are incorporated herein by reference.

A representative example of an adaptive optical element is a deformable mirror driven by a wavefront sensor and configured to compensate for atmospheric distortions that affect telescope images. Small naturally occurring variations in temperature (~1° C.) in the atmosphere cause random turbulent motion of the air and give rise to changes in the atmospheric density and, hence, to the index of refraction. The cumulative effect of these changes along the beam propagation path may lead to beam wandering and spreading and to beam intensity fluctuations, each of which degrades image quality. The wavefront sensor is a device that measures the distortions introduced in the atmosphere and generates feedback for the deformable mirror. Based on the feedback, the mirror is deformed such that the beam distortions are significantly reduced, thus improving the image quality.

U.S. Pat. No. 6,384,952, the teachings of which are incorporated herein by reference, discloses a representative prior-art device having a deformable membrane mirror connected to a plurality of actuators. To enable the membrane deformations, each actuator has two interleaved comb-shaped portions connected between the membrane and a substrate and offset with respect to each other in the direction perpendicular to the substrate. During the device fabrication process, the offset comb-shaped portions are typically formed in different layers of a layered wafer, which may result in certain wafer processing problems. For example, it may be relatively difficult to achieve proper alignment of the interleaved structures of said comb-shaped portions with respect to each other because different layers are processed during different fabrication steps using different lithographic masks.

SUMMARY OF THE INVENTION

Problems in the prior art are addressed, in accordance with the principles of the present invention, by a MEMS device, in which the distance between the ends of a flexible beam, at least one of which is coupled to a movable bar, may be changed so as to move the movable bar with respect to a substrate of the MEMS device. A motion drive may be employed to change the distance between the ends of the flexible beam. The motion drive may have a movable portion adapted to move substantially parallel to the substrate, while the flexible beam is adapted to transfer the motion to the movable bar such that its offset distance from the substrate is changed. Advantageously, in such an arrangement, due to this motion transfer, MEMS devices of the invention can employ planar motion drives and, yet, produce out-of-plane motion for the movable bar. During the device fabrication process, such planar motion drives can be formed using a single layer of a layered wafer, which alleviates stringent precision requirements for the alignment of lithographic masks corresponding to different wafer layers.

In one embodiment, the MEMS device has a spring structure formed by two flexible beams attached between the substrate and a movable bar. When non-end (intermediate) sections of the beams are pulled in opposite directions, the beams pull the movable bar toward the substrate, thereby transforming in-plane motion of the non-end sections into out-of-plane motion of the movable bar. When the non-end sections are displaced symmetrically, the movable bar translates toward or away from the substrate. Alternatively, when the non-end sections are displaced non-symmetrically, the movable bar rotates with respect to the substrate.

In another embodiment, the MEMS device has a motion drive with two comb-shaped portions. Each of the comb-shaped portions is (i) attached to a corresponding flexible beam, (ii) interleaved with the other comb-shaped portion, and (iii) adapted to move with respect to the substrate and that other comb-shaped portion. When a voltage differential is applied between the comb-shaped portions, they move substantially parallel to the substrate, thereby changing the shape of the beams and translating/rotating the movable bar. Advantageously, such a motion drive can be positioned at one side of the spring structure and, yet, provide a symmetric deformation of the flexible beams.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
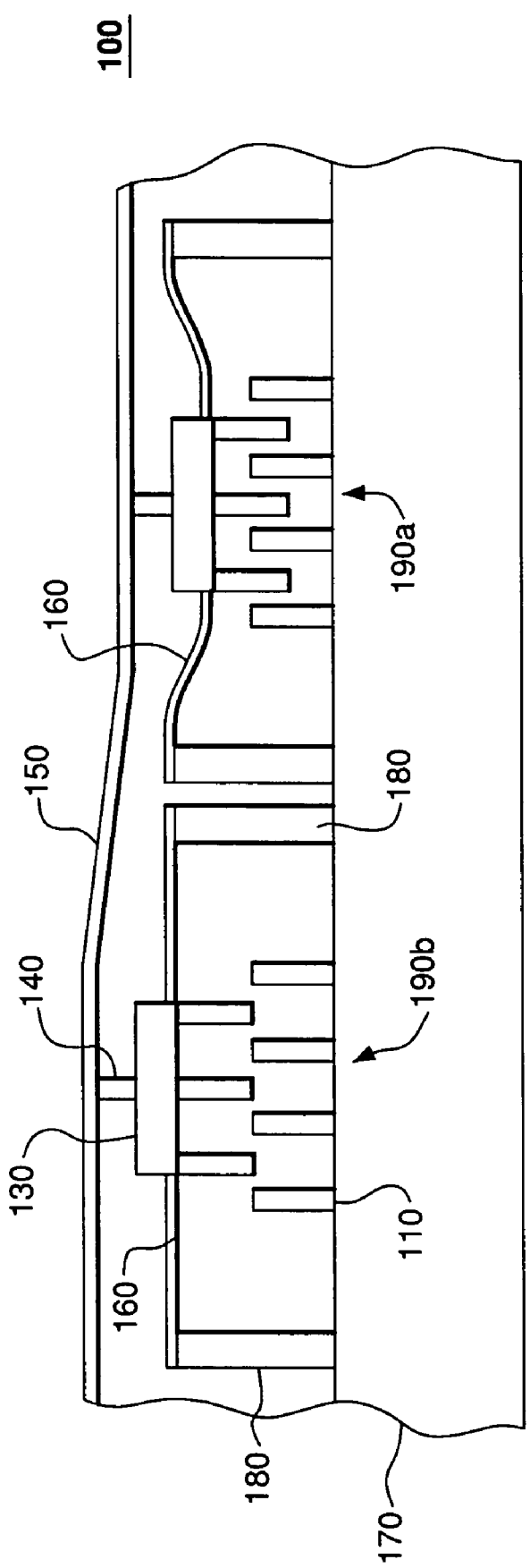
FIG. 1 shows a side cross-sectional view of a representative prior-art device having a deformable membrane.

FIG. 1 shows a side view of a representative prior-art device 100 disclosed in U.S. Pat. No. 6,384,952. Device 100 has a deformable membrane 150 connected to a plurality of actuators 190 supported on a substrate 170. Only two actuators 190a-b of the plurality are shown in FIG. 1. Each actuator 190 has (i) a stator 110 attached to substrate 170 and (ii) a slider 120 supported on the substrate by two anchors 180 and a spring 160. To transfer motion of slider 120 to membrane 150, device 100 has a pole 140 attached between the membrane and a slider bar 130. When a voltage differential is applied between stator 110 and slider 120 of actuator 190, the slider pulls membrane 150 toward substrate 170, e.g., as shown in actuator 190a. When the voltage differential is removed, the spring force of spring 160 returns slider 120 into the initial position, e.g., as shown in actuator 190b. When different actuators 190 are appropriately biased to produce different displacements, membrane 150 is deformed into a desirable shape, e.g., corresponding to wavefront distortions.

One problem with device 100 is related to its fabrication. More specifically, since stator 110 and slider 120 of actuator 190 are (vertically) offset with respect to each other, they are formed in different layers of a layered wafer typically used in the device fabrication process. Because different layers are processed during different fabrication steps using different lithographic masks, it is relatively difficult to achieve proper alignment of the interleaved comb structures of stator 110 and slider 120 with respect to each other. This difficulty arises primarily from the underlying requirement to overlay the lithographic masks with sub-micron precision.

Figure 2:
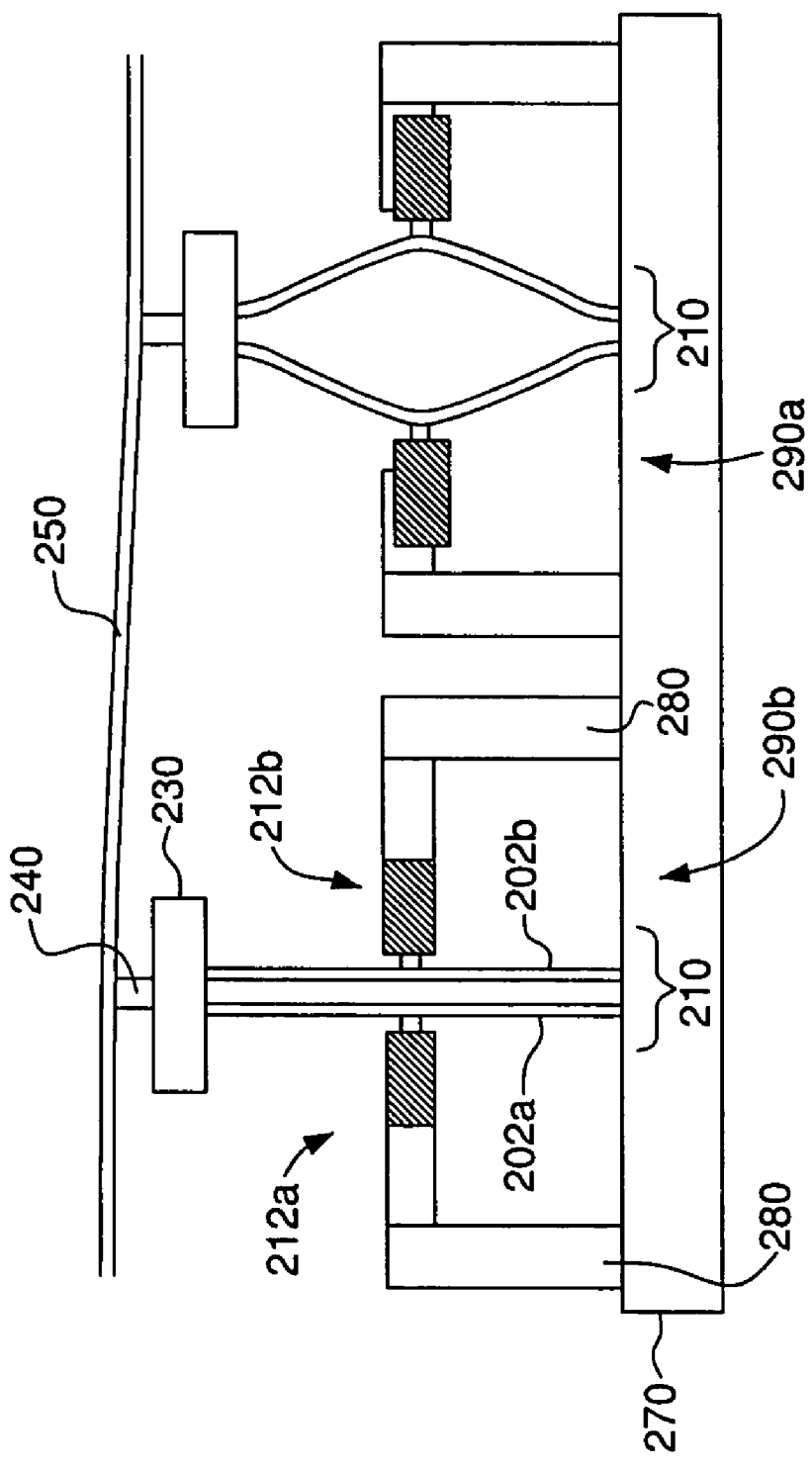
FIG. 2 shows a side cross-sectional view of a MEMS device having a deformable membrane according to one embodiment of the present invention.

FIG. 2 shows a side cross-sectional view of a MEMS device 200 according to one embodiment of the present invention. Device 200 has a deformable membrane 250 connected to a plurality of actuators 290 supported on a substrate 270. Each actuator 290, only two of which (actuators 290a–b) are shown in FIG. 2, has a spring structure 210 including two deformable beams 202a–b attached between substrate 270 and a slider bar 230. To transfer motion of slider bar 230 to membrane 250, device 200 has a pole 240 attached between the membrane and the slider bar. Beams 202a–b are flexible and can be bent, e.g., as shown in actuator 290a. When center portions of beams 202a–b are pulled in opposite directions, slider bar 230 is pulled toward substrate 270, thereby displacing the corresponding portion of membrane 250.

To flex beams 202a–b, actuator 290 has two motion drives 212a–b, each connected between the center section of the corresponding beam 202 and an anchor 280. In one embodiment, each drive 212 is a comb drive having two interleaved comb-shaped portions adapted to laterally displace the center section of beam 202, when a voltage differential is applied between said two portions. When the voltage differential is removed, the spring forces generated by deformed beam 202 return drive 212 into the initial state. Biased and non-biased states of drives 212 are illustrated in actuators 290a and 290b, respectively.

Unlike actuator 190 of prior-art device 100 (FIG. 1) whose interleaved comb-shaped portions (i.e., stator 110 and slider 120) are offset from substrate 170 by different distances, actuator 290 of device 200 has drives 212, each of which has a planar structure parallel to substrate 270. Due to the use of spring structure 210, actuator 290 transforms in-plane motion of drives 212 into out-of-plane motion of slider bar 230. Advantageously, during the device fabrication process, planar drives 212 can be formed using a single layer of a layered wafer and, consequently, the interleaved comb-shaped portions of drives 212 can be mapped onto that single layer using a single lithographic mask. This alleviates stringent precision requirements for the alignment of lithographic masks corresponding to different wafer layers.

Figure 3:
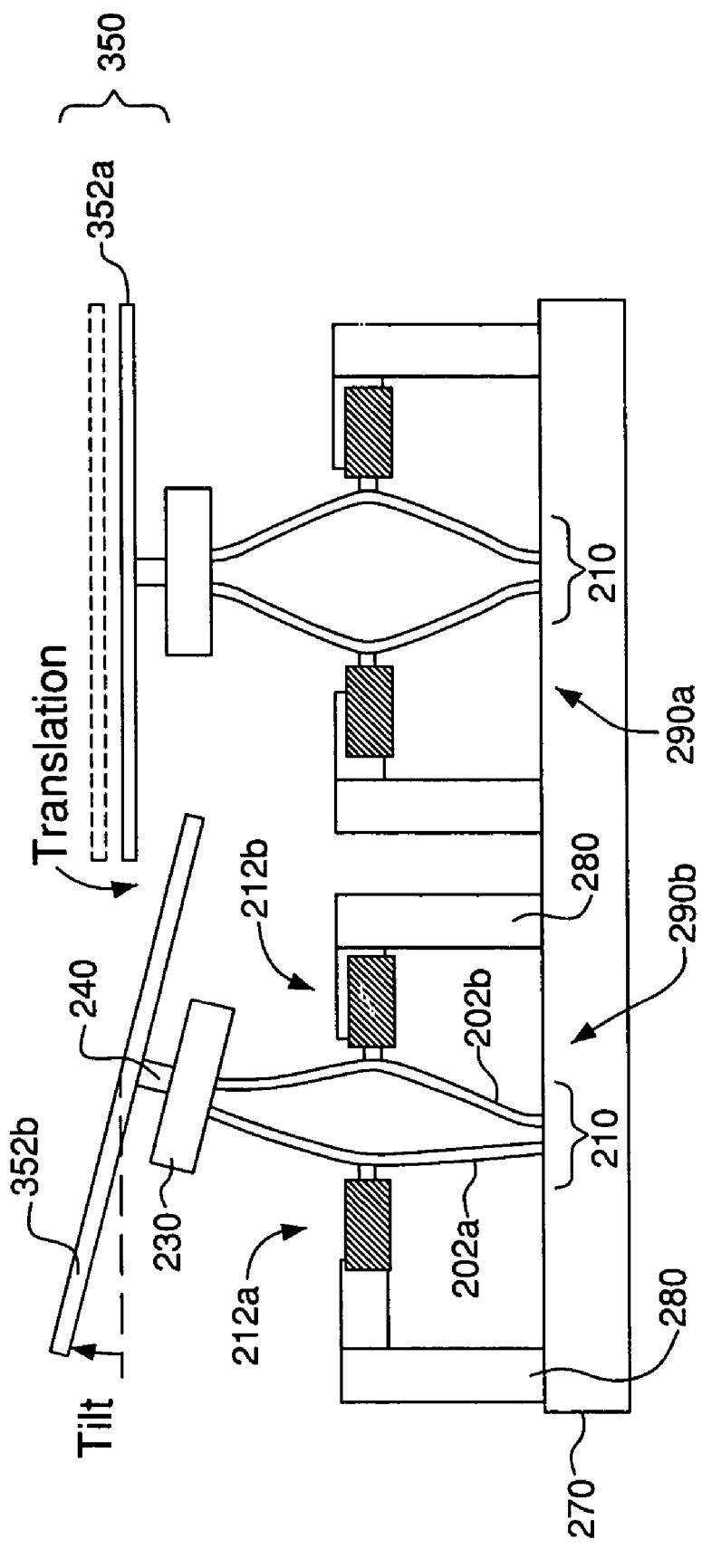
FIG. 3 shows a side cross-sectional view of a MEMS device having a segmented plate according to another embodiment of the present invention.

FIG. 3 shows a side cross-sectional view of a MEMS device 300 according to another embodiment of the present invention. Device 300 is similar to device 200 of FIG. 2 with one difference between said devices being that device 300 has a segmented plate 350 instead of deformable membrane 250. Segmented plate 350 has a plurality of segments 352, only two of which (segments 352a–b) are shown in FIG. 3. For each segment 352, device 300 has a corresponding actuator 290 adapted to translate and/or tilt the segment. For example, when beams 202a–b of actuator 290 are deformed symmetrically, the corresponding segment 352 is translated via piston-like motion as shown with segment 352a. Alternatively, when one beam 202 is deformed while the other beam remains substantially non-deformed, the corresponding segment 352 is rotated as shown with segment 352b. One skilled in the art will appreciate that non-symmetric deformation of both beams 202 will result in simultaneous translation and rotation of the corresponding segment 352.

Figure 4:
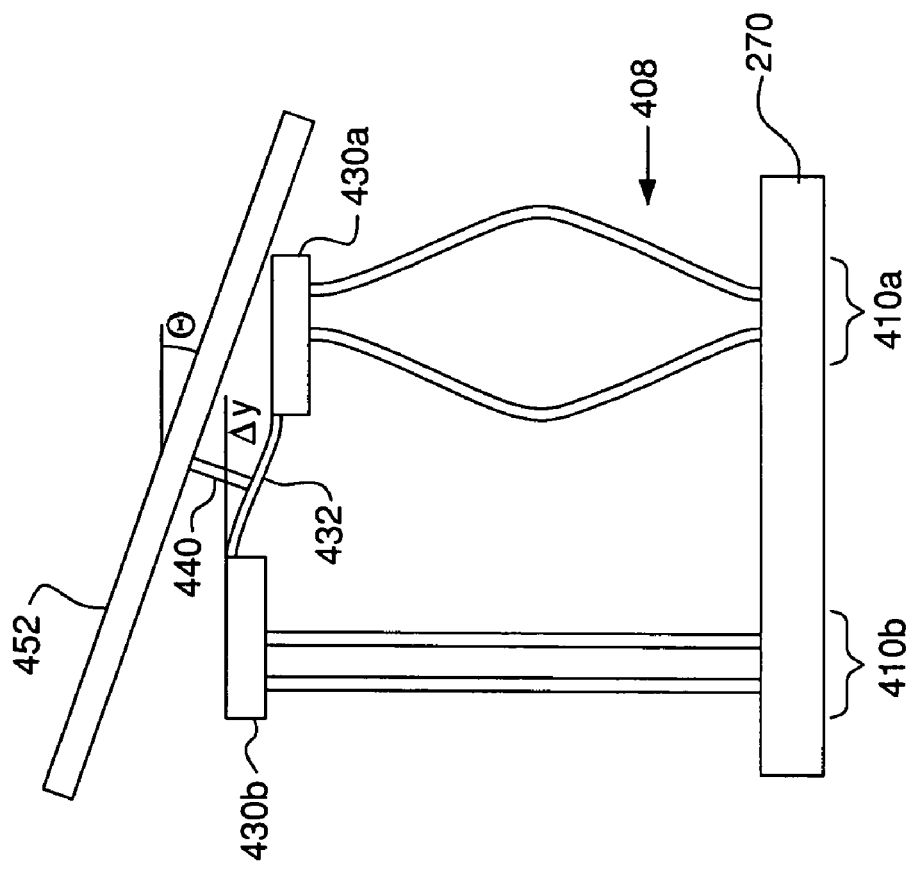
FIG. 4 shows a side view cross-sectional of a spring structure arrangement that can be used in a device similar to the device of FIG. 3 according to one embodiment of the present invention.

FIG. 4 shows a side cross-sectional view of a spring structure arrangement 408 that can be used in a device similar to device 300 according to one embodiment of the present invention. More specifically, arrangement 408 has two spring structures 410a–b per segment. Slider bars 430a–b corresponding to spring structures 410a–b, respectively, are connected by a deformable beam 432, on which segment 452 is mounted using a pole 440. One purpose of having two spring structures instead of one is the ability to tilt and/or translate segment 452 using only symmetric beam deformations within each spring structure. For example, when the deformable beams of spring structure 410a are symmetrically deformed while the deformable beams of spring structure 410b remain substantially undeformed as shown in FIG. 4, segment 452 is rotated by angle θ and a center point of the segment is translated toward substrate 270 by distance Δy.

Figure 5:
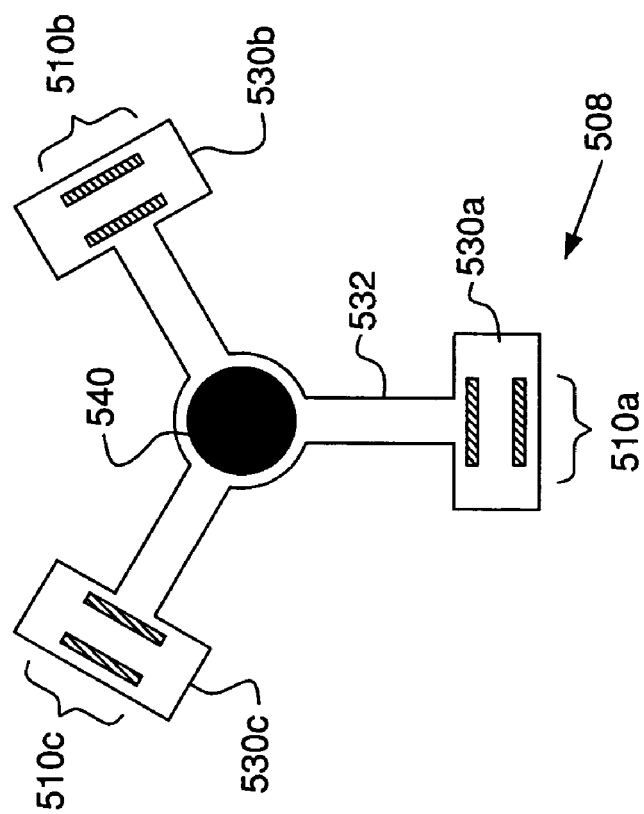
FIG. 5 shows a top view of a spring structure arrangement that can be used in a device similar to the device of FIG. 3 according to another embodiment of the present invention.

FIG. 5 shows a top view of a spring structure arrangement 508 that can be used in a device similar to device 300 according to another embodiment of the present invention. Arrangement 508 is similar to arrangement 408 (FIG. 4). However, arrangement 508 has three spring structures 510a–c per segment instead of two such springs in arrangement 408. Slider bars 530a–c corresponding to spring structures 510a–c are connected by a trampoline beam structure 532, on which a segment (not shown in FIG. 5) of the corresponding segmented plate is mounted using a pole 540. One purpose of having three spring structures per segment instead of two is the added capability to tilt the segment in any desired direction.

Figure 6:
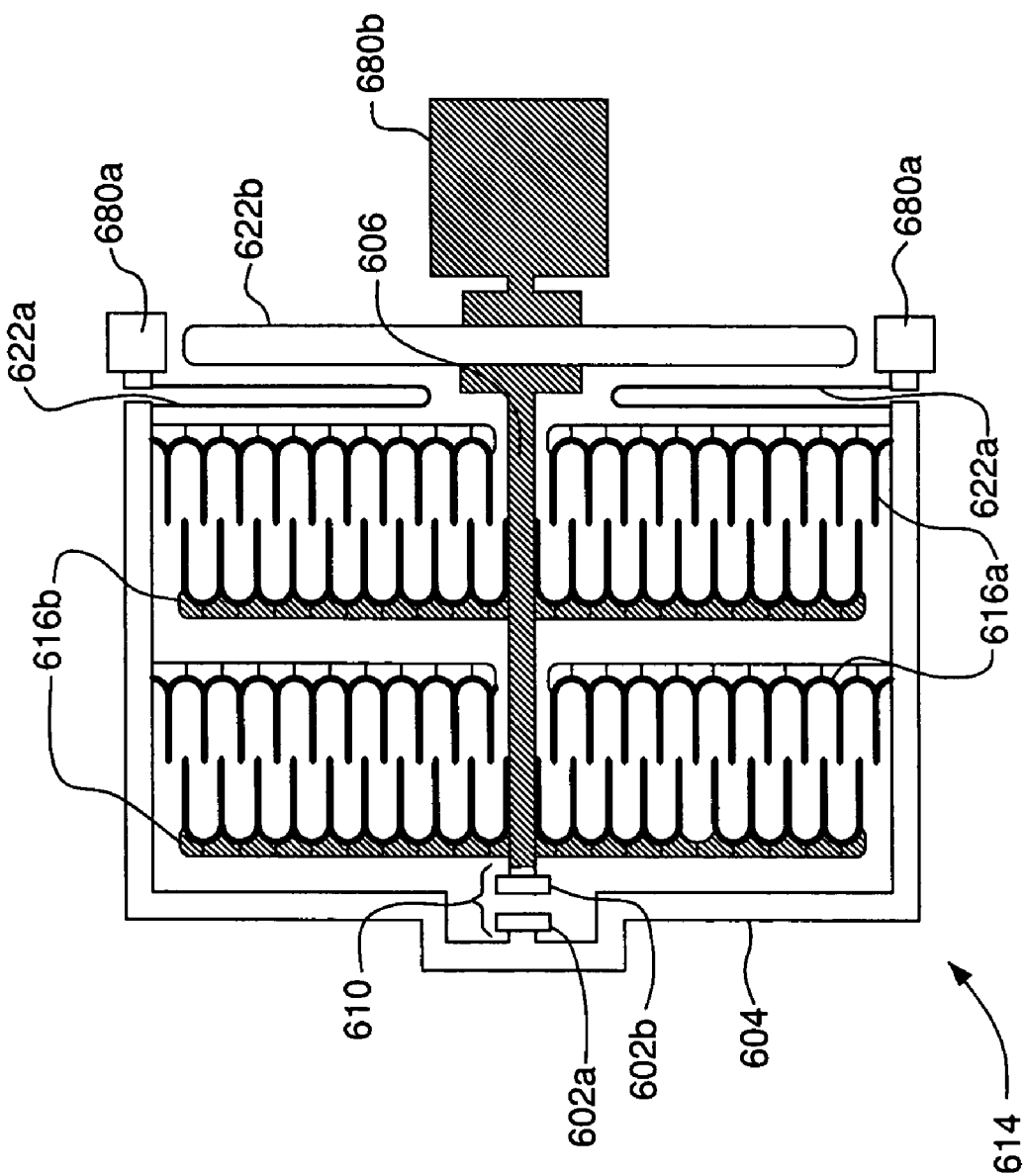
FIG. 6 shows a top view of a motion drive that can be used with the spring structure arrangement of FIG. 5 according to one embodiment of the present invention.

FIG. 6 shows a comb drive 614 that can be used with spring structure arrangement 508 of FIG. 5 according to one embodiment of the present invention. More specifically, drive 614 has two movable comb-shaped portions 616a and 616b mounted on a movable support frame 604 and a movable support shaft 606, respectively. Frame 604 is connected, at one side, to deformable beam 602a of a spring structure 610 (extending perpendicular to the plane of FIG. 6) and, at the other side, via springs 622a, to anchors 680a. Similarly, shaft 606 is connected, at one end, to deformable beam 602b of spring structure 610 and, at the other end, via spring 622b, to an anchor 680b. Anchors 680a–b are similar to anchors 280 of device 300 (FIG. 3) and are attached to the substrate on which drive 614 is mounted.

One novel structural feature of drive 614 is that both comb-shaped portions 616a–b of said drive are movable with respect to the substrate. In contrast, a prior-art comb drive typically has only one movable portion, while the other portion is fixedly connected to the substrate (see, e.g., FIG. 1). Due to this novel feature, drive 614 can be placed at one side of spring structure 610 as shown in FIG. 6 and, yet, provide a symmetric deformation of that spring structure similar to one shown in spring structure 410a of FIG. 4. For example, when a voltage differential is applied between portions 616a–b of drive 614, an attractive electrostatic force causes these portions to move toward each other, such that each portion also moves with respect to the substrate, thereby deforming beams 602a–b and springs 622a–b. The elastic spring force generated by the deformation of beams 602a–b and springs 622a–b provides the counterbalance force to the electrostatic force. However, springs 622a–b are designed to be relatively soft, such that almost the entire counterbalance force comes from the deformation of beams 602a–b. When beams 602a–b have substantially identical stiffness, action of the electrostatic force will cause equal displacements of the center sections of the beams in opposite directions, thereby producing a symmetric deformation of spring structure 610. Alternatively, when beams 602a–b have different stiffness values, action of the electrostatic force will cause different displacements of the center sections of the beams, thereby producing a non-symmetric deformation of spring structure 610.

Figure 7:
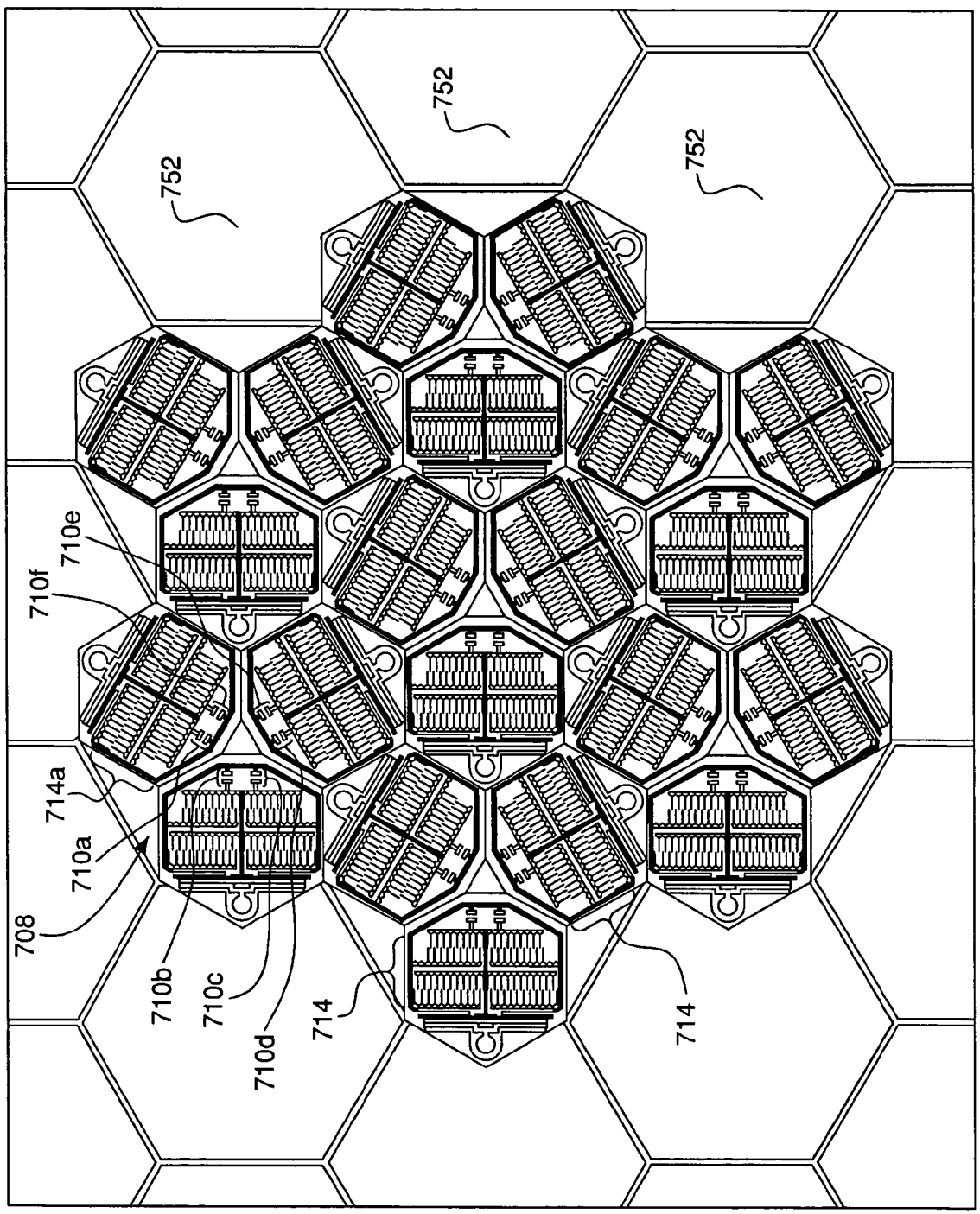
FIG. 7 shows a cutout top view of a MEMS device having a segmented plate according to yet another embodiment of the present invention.

FIG. 7 shows a cutout top view of a MEMS device 700 according to yet another embodiment of the present invention. Device 700 is analogous to device 300 (FIG. 3) and has a segmented plate having a plurality of segments 752. For each segment 752, device 700 has a spring structure arrangement 708 that is analogous to arrangement 508 of FIG. 5. However, one difference between arrangement 708 and arrangement 508 is that the former has six spring structures 710a–f grouped in three pairs instead of three individual spring structures 510a–c in the latter. Each pair of spring structures 710 is connected to a corresponding comb drive 714, which is similar to comb drive 614 of FIG. 6. For example, spring structures 710a and 710f are connected to comb drive 714a. One purpose of having additional spring structures in arrangement 708 is, for each comb-shaped portion of drive 714, to have two relatively far-separated points to which the counterbalance spring forces generated by the deformed beams are applied. This enhances stability of comb drive 714 with respect to undesirable lateral displacements of the comb-shaped portions.

Figure 8B:
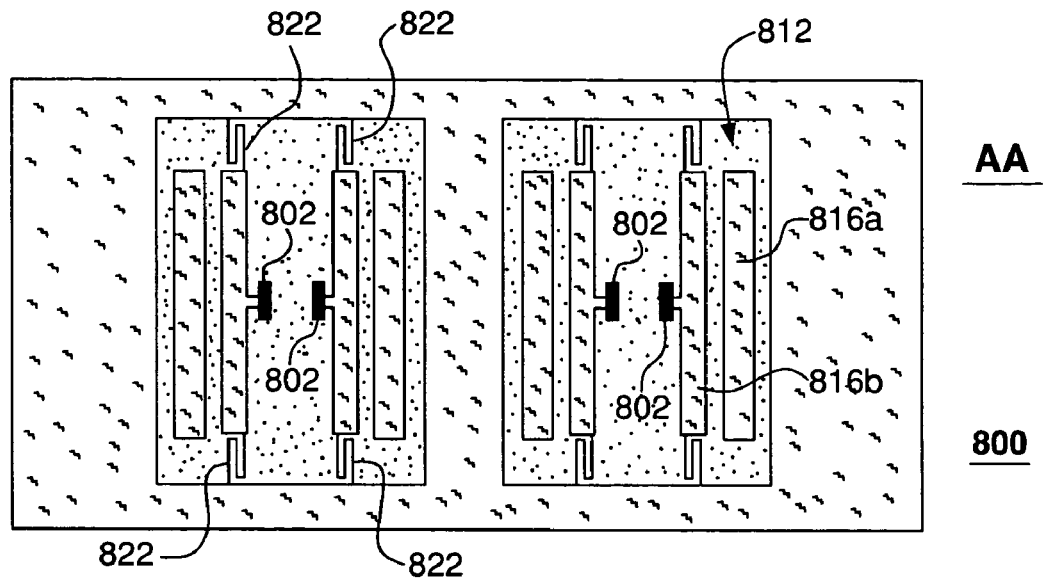
FIGS. 8A–B show side and top cross-sectional views, respectively, of a MEMS device according to yet another embodiment of the present invention.
Figure 8A:
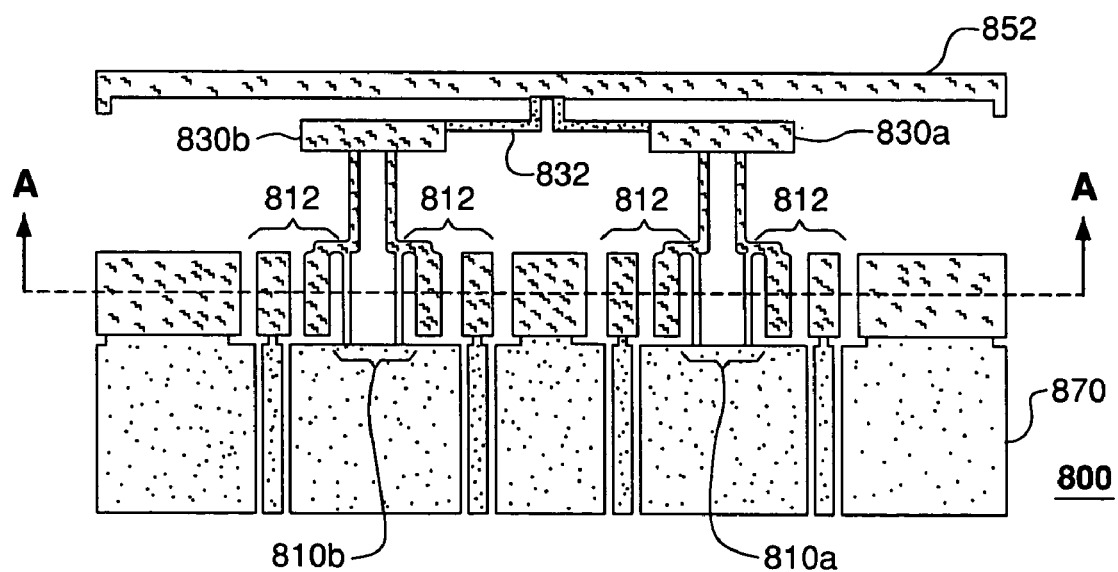

FIGS. 8A–B show side and top cross-sectional views, respectively, of a MEMS device 800 according to yet another embodiment of the present invention. Device 800 is analogous to device 300 (FIG. 3) and has a movable segment 852 and two spring structures 810a–b arranged similar to spring structures 410a–b of FIG. 4. Slider bars 830a–b corresponding to spring structures 810a–b are connected by a beam structure 832, on which segment 852 is mounted. For each deformable beam 802 of spring structures 810a–b, device 800 has an in-plane drive 812 comprising (i) a stationary portion 816a fixedly connected to a substrate 870 and (ii) a movable portion 816b connected to the center section of beam 802 and suspended over the substrate by two serpentine springs 822. Each drive 812 can be individually biased to produce a desired deflection of the corresponding beam 802 to translate and/or rotate segment 852.

Figure 9D:
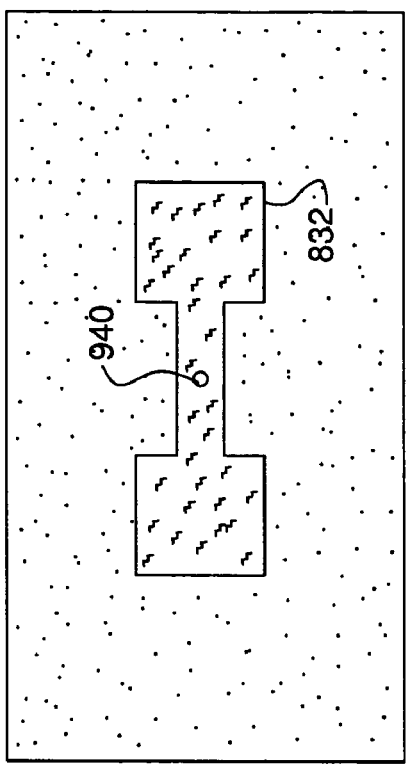
FIGS. 9A–S illustrate representative fabrication steps of the device shown in FIG. 8 according to one embodiment of the invention.
Figure 9C:
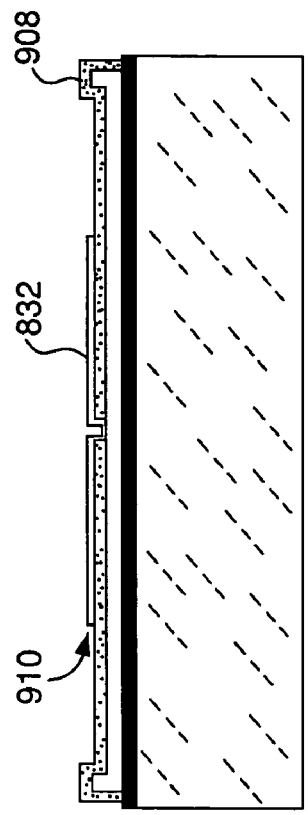
Figure 9B:
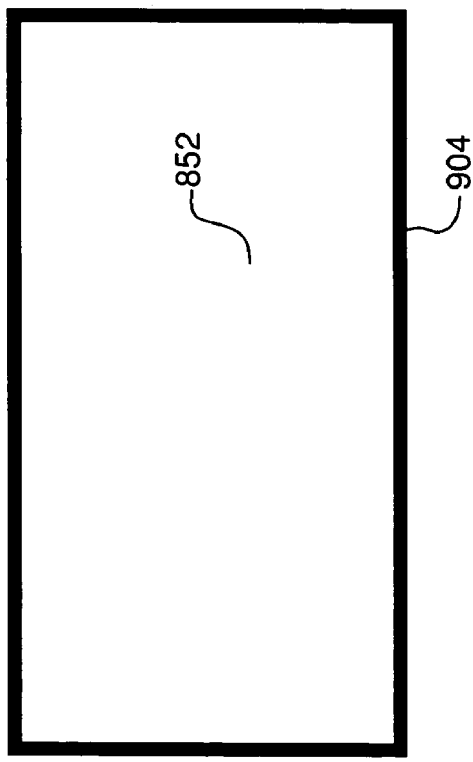
Figure 9A:
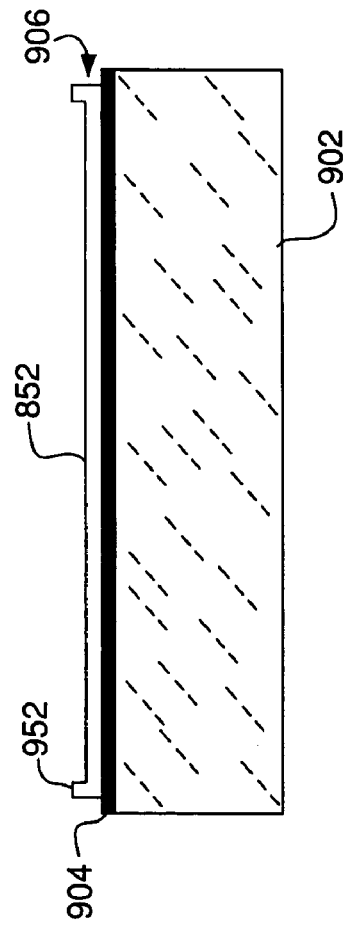

FIGS. 9A–S schematically illustrate representative fabrication steps of device 800 according to one embodiment of the invention. More specifically, FIGS. 9A, 9C, 9E, 9G, 9I, 9K, 9M, 9O, 9Q, and 9S show side views of device 800 during those fabrication steps, whereas FIGS. 9B, 9D, 9F, 9H, 9J, 9L, 9N, 9P, and 9R show the corresponding top views of the device. The side and top views shown in FIG. 9 correspond to the side and top views shown in FIG. 8.

Referring to FIGS. 9A–B, in one embodiment, fabrication of device 800 begins with a silicon-on-insulator (SOI) wafer having (i) two silicon layers, i.e., a substrate layer 902 and an overlayer 906, and (ii) a silicon oxide layer 904 located between overlayer 906 and substrate layer 902. Segment 852 is defined in overlayer 906 using reactive etching, which stops at the silicon oxide layer. A timed etch of overlayer 906 can be used to thin the inner portion of segment 852 and create stiffening ribs 952 around the segment perimeter.

Referring to FIGS. 9C–D, first, a thin (e.g., 2 μm) silicon oxide layer 908 is deposited over segment 852. Second, layer 908 is patterned and etched to form an opening 940 for a pole connecting segment 852 to deformable beam structure 832 (not formed yet, see FIG. 8A). Then, a thin (e.g., 0.5 μm) poly-silicon layer 910 is deposited over layer 908. Finally, layer 910 is patterned and etched to form beam structure 832.

Figure 9G:
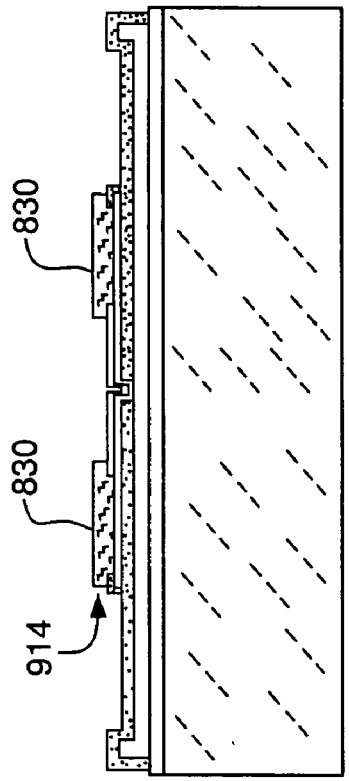
Figure 9H:
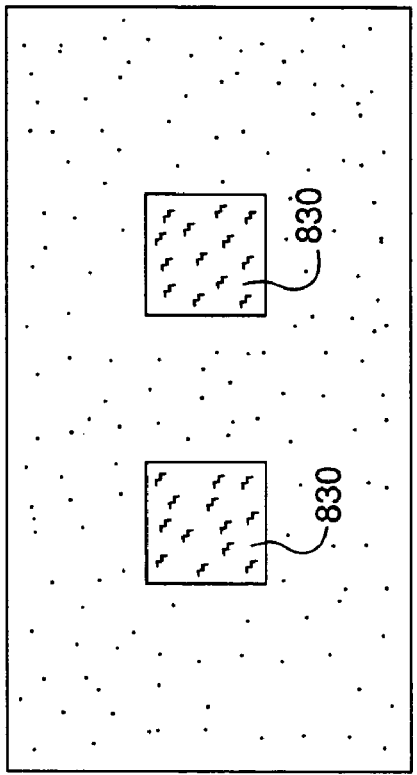
Figure 9E:
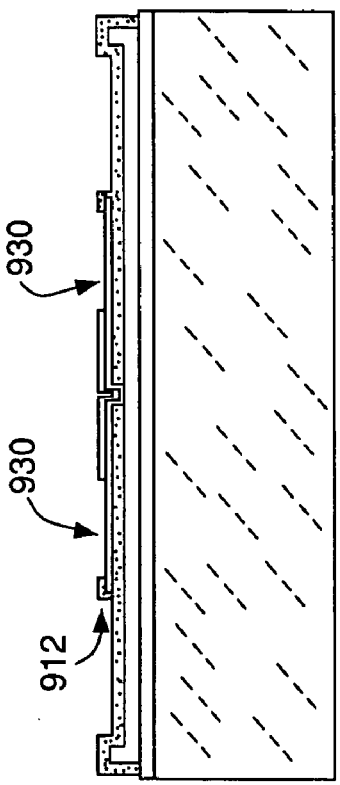
Figure 9F:
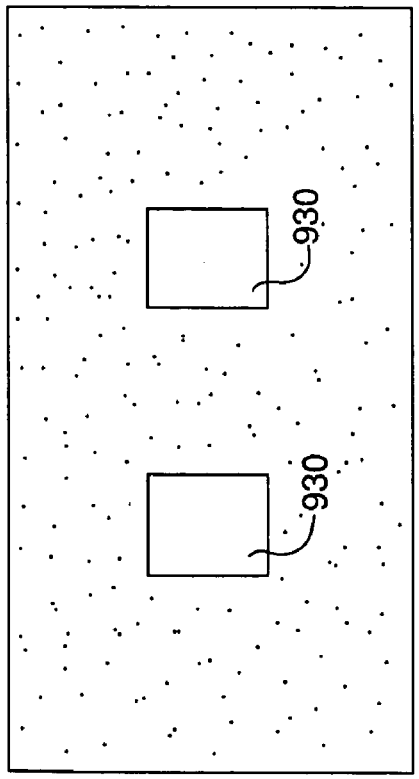

Referring to FIGS. 9E–F, first, a thin (e.g., 1 μm) silicon oxide layer 912 is deposited over the structure of FIGS. 9C–D. Then, layer 912 is patterned and etched to form openings 930 for slider bars 830 (not formed yet, see FIG. 8A).

Referring to FIGS. 9G–H, first, a thin (e.g., 2 μm) poly-silicon layer 914 is deposited over the structure of FIGS. 9E–F. Then, layer 914 is patterned and etched to form slider bars 830 (see FIG. 8A).

Figure 9L:
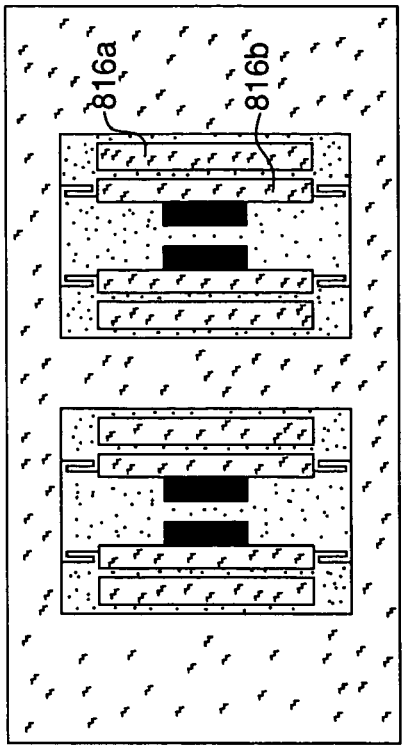
Figure 9K:
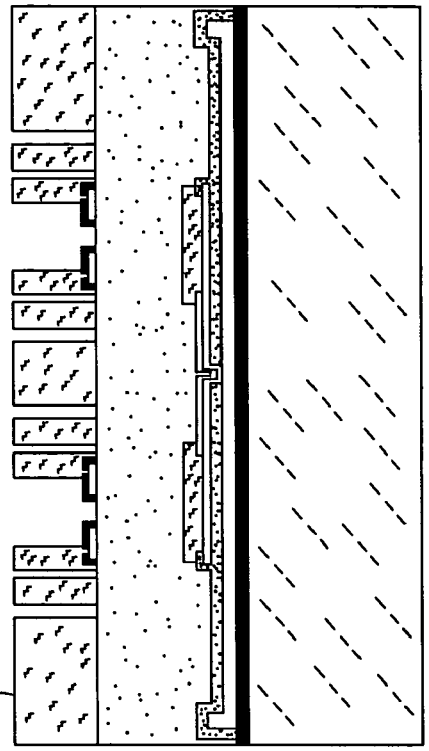
Figure 9J:
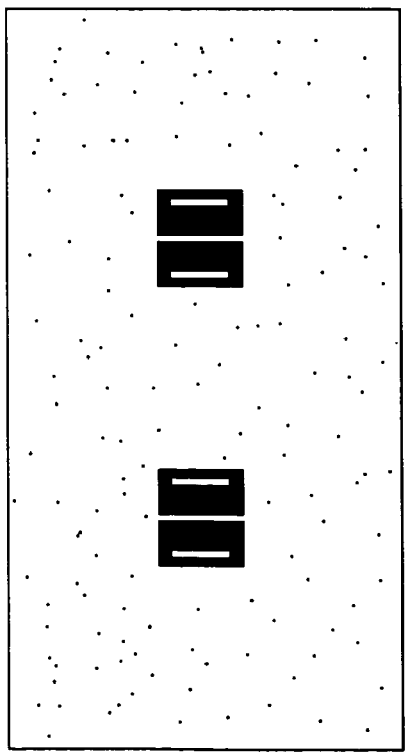
Figure 9I:
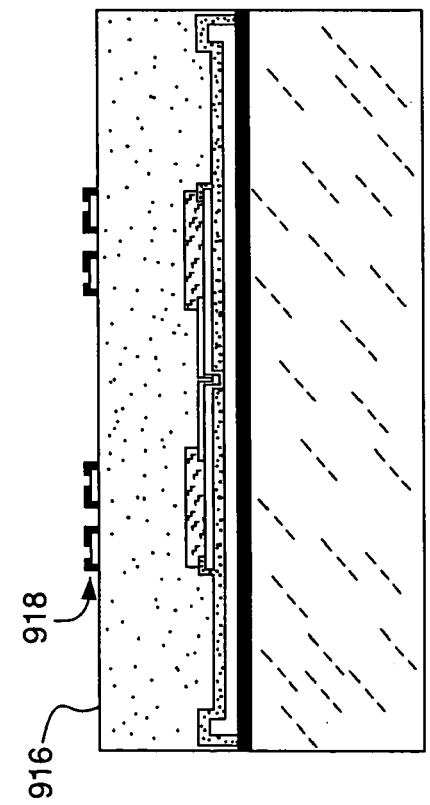

Referring to FIGS. 9I–J, first, a thick (e.g., 10 μm) silicon oxide layer 916 is deposited over the structure of FIGS. 9G–H. The thickness of layer 916 determines the vertical offset of segment 852 with respect to the driver layer and, therefore, the maximum possible tilt angle of the segment (see also FIG. 8A). Second, a thin (e.g., 1 μm) poly-silicon layer 918 is deposited over layer 916. Then, layer 918 is patterned and etched to create the structures that will tie beams 802 to drives 812 (not formed yet, see FIG. 8A). Finally, a thin layer of slow-etching thermal silicon oxide is formed over the tying structures. This layer is patterned and etched to provide an appropriate etch stop for the subsequent processing steps.

Referring to FIGS. 9K–L, first, a relatively thick (e.g., 5 μm) poly-silicon layer 920 is deposited over the structure of FIGS. 9I–J. Then, layer 920 is patterned and etched to form drivers 812 and serpentine springs 822 (see also FIG. 8B).

Figure 9N:
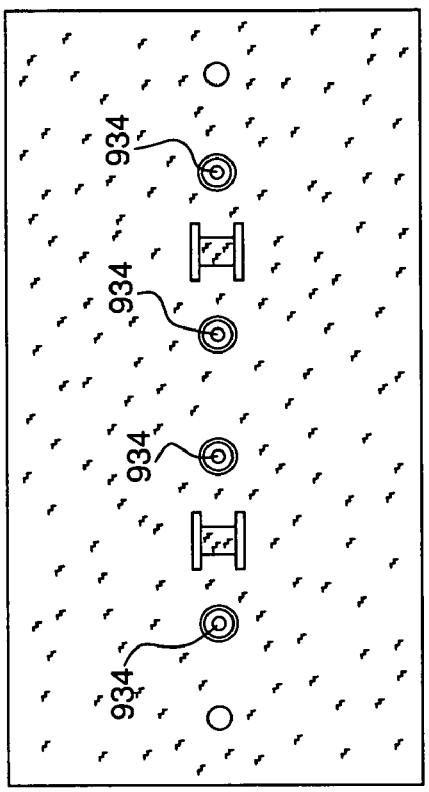
Figure 9P:
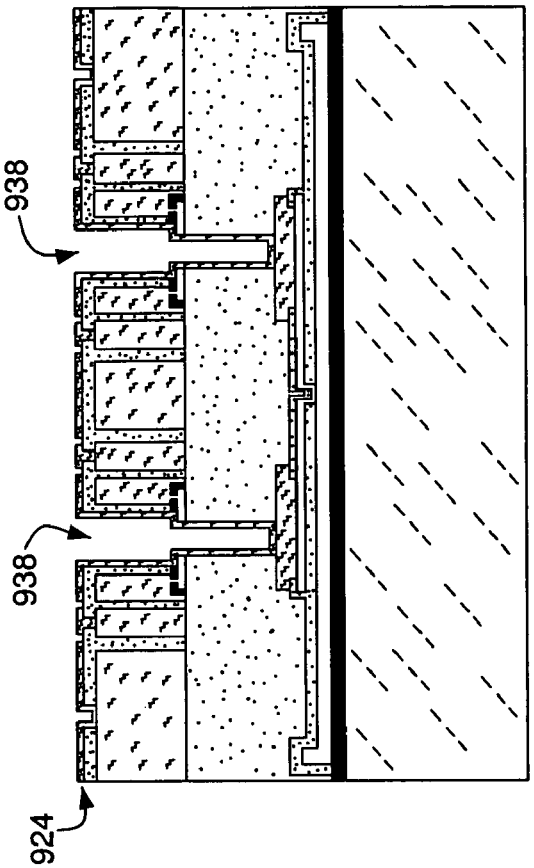
Figure 9M:
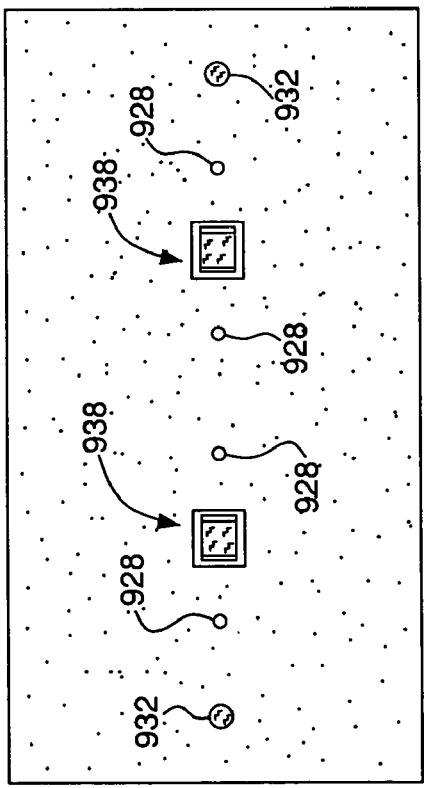

Referring to FIGS. 9M–N, first, a thin (e.g., 1 μm) silicon oxide layer 922 is deposited over the structure of FIGS. 9K–L. Then, layer 922 is patterned and etched to form openings 928 and 932 for future via structures. In particular, the via structures corresponding to openings 928 provide electrical contact of portions 816a (FIGS. 8B and 9L) with the corresponding bias electrodes (not formed yet), and the via structures corresponding to openings 932 provide electrical contact of layer 920 with substrate layer 870 (not formed yet). In addition, openings 938 are formed in layers 922, 920, and 916 to expose slider bars 830.

Figure 9O:
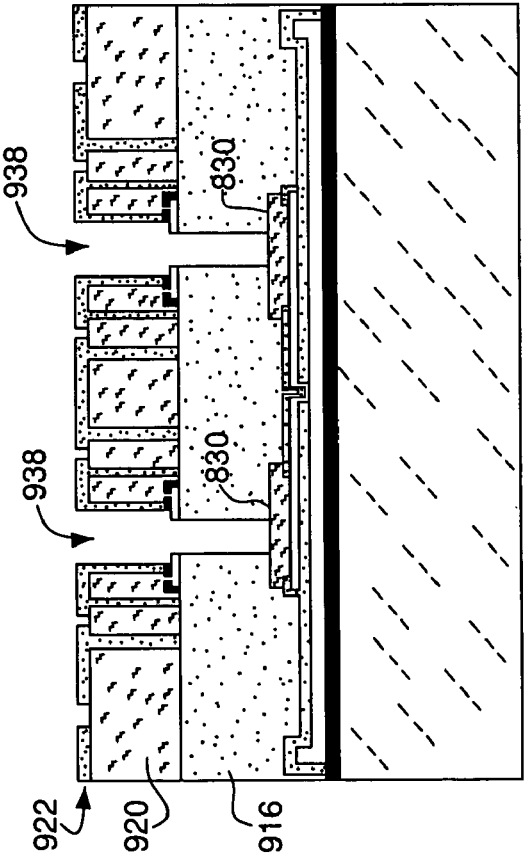

Referring to FIGS. 9O–P, first, a thin (e.g., 0.5 μm) adaptive poly-silicon layer 924 is deposited over the structure of FIGS. 9M–N. Layer 924 covers the walls of openings 938. Then, layer 924 is patterned and etched to create contact pads 934 for the bias electrodes and to form deformable beams 802 of spring structures 810.

Referring to FIGS. 9Q–R, first, a thin (e.g., 2 μm) silicon oxide layer 926 is deposited over the structure of FIGS.

9O–P such that it partially fills openings 938. Layer 926 is then patterned and etched to provide access to contact pads 934 and the via structures of openings 932. Second, thick (e.g., 10 µm) silicon substrate layer 870 is deposited over layer 926. Substrate layer 870 is patterned and etched to create electrodes 944 corresponding to portions 816a of drivers 812, which electrodes are electrically isolated from the rest of the substrate layer by the grooves surrounding each electrode. Then, substrate layer 902 is etched as shown in FIG. 9Q to create a removable cradle.

Finally, referring to FIG. 9S, exposed portions of various oxide layers are removed (e.g., etched away) to release the movable parts of device 800 and expose segment 852. Note that the view shown in FIG. 9S is flipped with respect to the view shown in FIG. 9Q. A thin layer of metal, e.g., gold, is optionally deposited over the outer surface of segment 852 for better reflectivity and over electrodes 944 for better electrical contact with wire terminals (not shown).

Different etching techniques may be used to fabricate device 800 from the initial SOI wafer. It is known that silicon etches significantly faster than silicon oxide using, e.g., selective reactive ion etching (RIE). Similarly, silicon oxide etches significantly faster than silicon using, e.g., fluorine-based etchants. Additional layers of material (e.g., layers 908–926) may be deposited using, e.g., chemical vapor deposition. Various parts of device 800 may be mapped onto the corresponding layers using lithography. Additional description of various fabrication steps may be found in U.S. Pat. Nos. 6,201,631, 5,629,790, and 5,501,893, the teachings of which are incorporated herein by reference.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although fabrication of MEMS devices of the invention has been described in the context of using silicon/silicon oxide SOI wafers, other suitable materials, such as germanium-compensated silicon, may similarly be used. The materials may be appropriately doped as known in the art. Various surfaces may be modified, e.g., by metal deposition for enhanced reflectivity and/or electrical conductivity or by ion implantation for enhanced mechanical strength. Differently shaped membranes, plates, segments, beams, drives, actuators, and/or electrodes may be implemented without departing from the scope and principle of the invention. Springs may have different shapes and sizes, where the term "spring" refers in general to any suitable elastic structure that can recover its original shape after being distorted. A MEMS device of the invention may be configured to have one or more of its springs in a deformed (loaded or stretched) state when the corresponding one or more deformable plates are at their initial prescribed position or at any position within the available position range. Various MEMS devices of the invention may be arrayed as necessary and/or apparent to a person skilled in the art.

I claim:

1. A MEMS device, comprising:
    a first flexible beam coupled at a first end to a substrate and at a second end to a movable plate positioned at an offset distance from the substrate, said first and second ends separated by a prescribed distance at a rest position; and
    one or more motion drives adapted to change the distance between the first and second ends from said prescribed distance, thereby changing the offset distance.

2. The device of claim 1, wherein:
    the one or more motion drives have one or more movable portions supported on the substrate and mechanically coupled to the first flexible beam, said portions adapted to move substantially along a plane parallel to the substrate; and
    the first flexible beam is adapted to transfer motion from the one or more movable portions to the movable plate such that the offset distance is changed.

3. The device of claim 1, wherein the prescribed distance corresponds to a loaded state of the first flexible beam.

4. The device of claim 1, wherein the device has a second flexible beam coupled to the substrate, the movable plate, and the one or more motion drives.

5. The device of claim 4, wherein the one or more motion drives are adapted to bend the flexible beams, wherein, when non-end sections of the first and second flexible beams move in opposite directions, the offset distance is changed.

6. The device of claim 5, wherein:
    the one or more motion drives are adapted to move the non-end sections of the first and second flexible beams in the opposite directions by substantially equal distances; and
    the movable plate is adapted to translate with respect to the substrate.

7. The device of claim 5, wherein:
    a first motion drive is adapted to bend the first flexible beam;
    a second motion drive is adapted to bend the second flexible beam;
    bending of the first flexible beam and bending of the second flexible beam are substantially independent of each other; and
    the movable plate is adapted to rotate with respect to the substrate.

8. The device of claim 5, wherein the one or more motion drives include a motion drive having (i) a first portion fixedly connected to the substrate and (ii) a second portion attached to the non-end section of the corresponding flexible beam, wherein, when a voltage differential is applied between the first and second portions, the second portion moves with respect to the substrate, thereby bending said flexible beam.

9. The device of claim 1, wherein the plate has a reflective surface.

10. The device of claim 1, comprising two or more spring structures, each spring structure having two flexible beams connected to the substrate, wherein:
    the two spring structures are connected by a beam structure; and
    the plate is mounted on the beam structure.

11. The device of claim 1, wherein the plate is a segment of a segmented plate.

12. The device of claim 11, wherein each segment is adapted to move substantially independent of every other segment.

13. The device of claim 1, wherein:
    the plate comprises a deformable membrane; and
    motion generated by the one or more motion drives deforms the membrane.

14. The device of claim 1, wherein the one or more motion drives include a motion drive having first and second movable portions, each adapted to move with respect to the substrate and the other movable portion.

15. A MEMS device, comprising:
a spring structure coupled between a substrate and a movable plate positioned at an offset distance from the substrate; and
one or more motion drives having one or more movable portions supported on the substrate and mechanically coupled to the spring structure, wherein:
the one or more movable portions are adapted to move substantially along a plane parallel to the substrate; and
the spring structure is adapted to transfer motion of the one or more movable portions to the movable plate such that the offset distance is changed.

16. The device of claim 15, wherein:
the spring structure has one or more flexible beams, each coupled to at least two of: (i) the substrate, (ii) the movable plate, and (iii) one of the motion drives; and
the one or more motion drives are adapted to bend the one or more flexible beams to change the offset distance.

17. The device of claim 16, wherein the one or more motion drives include a motion drive having (i) a first portion fixedly connected to the substrate and (ii) a second portion attached to the corresponding flexible beam, wherein, when a voltage differential is applied between the first and second portions, the second portion moves with respect to the substrate, thereby bending said flexible beam.

18. The device of claim 16, wherein:
the one or more motion drives include a motion drive having first and second movable portions, each adapted to move with respect to the substrate and the other movable portion;
the first movable portion is attached to a first flexible beam; and
the second movable portion is attached to a second flexible beam, wherein, when a voltage differential is applied between the first and second portions, the first and second portions move with respect to the substrate and each other, thereby bending the first and second flexible beams.

19. The device of claim 15, wherein the one or more motion drives include a motion drive having first and second movable portions, each adapted to move with respect to the substrate and the other movable portion.

20. The device of claim 15, wherein:
the one or more motion drives include a planar motion drive; and
the device is fabricated using a layered wafer such that the planar motion drive is fabricated from a single layer of said wafer.

21. A MEMS device, comprising a motion drive supported on a substrate and having first and second movable portions, wherein, when a voltage differential is applied between the first and second portions, the first and second portions move with respect to the substrate and each other.

22. The device of claim 21, further comprising a spring structure having first and second flexible beams coupled between the substrate and a movable plate, wherein the motion drive is adapted to bend the flexible beams.

23. The device of claim 22, wherein:
the first movable portion is coupled to a non-end section of the first flexible beam; and
the second movable portion is coupled to a non-end section of the second flexible beam, wherein, when the non-end sections of the first and second flexible beams move in opposite directions substantially parallel to the substrate, the movable plate moves with respect to the substrate.

24. The device of claim 23, wherein, when the voltage differential is applied between the first and second portions, said non-end sections of the first and second flexible beams move in opposite directions by substantially equal distances and the movable plate translates toward or away from the substrate.

25. The device of claim 21, wherein:
the motion drive is a planar motion drive; and
the first and second movable portions are adapted to move substantially along a plane parallel to the substrate.

26. The device of claim 25, wherein the device is fabricated using a layered wafer and the motion drive is fabricated from a single layer of said wafer.

27. A method of operating a MEMS device, the method comprising:
changing the distance between first and second ends of a flexible beam from a prescribed distance, wherein:
the flexible beam is coupled at the first end to a substrate and at the second end to a movable plate positioned at an offset distance from the substrate, said first and second ends separated by the prescribed distance at a rest position; and
said change from the prescribed distance causes a change of the offset distance.

28. The method of claim 27, further comprising moving a non-end section of the flexible beam substantially along a plane parallel to the substrate, wherein the flexible beam is adapted to transfer said motion to the movable plate to change the offset distance.

29. A MEMS device, comprising:
flexible means for supporting a movable plate positioned at an offset distance from a substrate, said flexible means having a first end coupled to the substrate and a second end coupled to the movable plate; and
means for changing the distance between the first and second ends, wherein:
the first and second ends are separated by a prescribed distance at a rest position; and
change of the distance between the first and second ends from the prescribed distance causes a change of the offset distance.

* * * * *